United States Patent
Shigeno et al.

(10) Patent No.: US 7,605,368 B2
(45) Date of Patent: Oct. 20, 2009

(54) VIBRATION-TYPE CANTILEVER HOLDER AND SCANNING PROBE MICROSCOPE

(75) Inventors: Masatsugu Shigeno, Chiba (JP); Masato Iyoki, Chiba (JP)

(73) Assignee: SII NanoTechnology Inc. (JP)

( * ) Notice: Subject to any disclaimer, the term of this patent is extended or adjusted under 35 U.S.C. 154(b) by 314 days.

(21) Appl. No.: 11/595,184

(22) Filed: Nov. 9, 2006

(65) Prior Publication Data
US 2007/0104079 A1  May 10, 2007

(30) Foreign Application Priority Data
Nov. 10, 2005  (JP)  ............... 2005-325774

(51) Int. Cl.
*G11B 9/00* (2006.01)
*G01N 23/00* (2006.01)
*G21K 7/00* (2006.01)

(52) U.S. Cl. ............... 250/306; 250/307; 250/310; 310/311; 310/323.01; 310/323.06; 310/328; 73/104; 73/105; 324/520; 324/690; 324/762; 359/196.1; 359/197.1; 359/198.1; 359/199.1; 369/126; 369/127; 369/129; 850/1; 850/21; 850/29; 850/33; 850/40; 850/52; 850/53; 850/63

(58) Field of Classification Search ............... 250/216, 250/306, 307, 310; 369/126–129; 310/311, 310/323.01, 323.06, 328, 329, 345; 324/519–522, 324/686, 690, 762; 73/104, 105; 359/196–199, 359/213, 214, 199.2, 199.3, 199.4, 213.1, 359/214.1, 199.1; 850/1, 21, 29, 33, 40, 850/45, 52, 53, 63
See application file for complete search history.

(56) References Cited
U.S. PATENT DOCUMENTS

| | | | | |
|---|---|---|---|---|
| 5,652,377 A * | 7/1997 | Yagi | ............... | 73/105 |
| 5,918,274 A * | 6/1999 | Chen et al. | ............... | 73/105 |
| 6,008,489 A * | 12/1999 | Elings et al. | ............... | 250/234 |
| 6,073,485 A * | 6/2000 | Kitamura | ............... | 73/105 |
| 6,094,972 A * | 8/2000 | Yasutake et al. | ............... | 73/105 |
| 6,167,753 B1 * | 1/2001 | Chen et al. | ............... | 73/105 |
| 6,220,084 B1 * | 4/2001 | Chen et al. | ............... | 73/105 |
| 6,666,075 B2 * | 12/2003 | Mancevski et al. | ............... | 73/105 |
| 7,137,291 B2 * | 11/2006 | Mancevski | ............... | 73/105 |
| 7,427,744 B2 * | 9/2008 | Watanabe | ............... | 250/216 |
| 2004/0134265 A1 * | 7/2004 | Mancevski | ............... | 73/105 |

(Continued)

*Primary Examiner*—Bernard E Souw
(74) *Attorney, Agent, or Firm*—Adams & Wilks

(57) ABSTRACT

A vibration-type cantilever holder holds a cantilever opposed to a sample. The holder supports a main body part of the cantilever at only its base end so that a probe at the free end of the cantilever can contact the sample. The holder has a cantilever-attaching stand on which the main body part is placed and fastened such that the cantilever is tilted at a predetermined angle with respect to the sample. A first vibration source is fastened to the cantilever-attaching stand and vibrates with a phase and an amplitude depending on a predetermined waveform signal, and the first vibration source is fastened at a first location to a holder main body. A second vibration source is fastened at a second location, which is spaced from the first location, to the holder main body and generates vibrations to offset vibrations traveling from the first vibration source to the cantilever-attaching stand and holder main body. The holder allows the cantilever to vibrate according to the vibrational characteristics of only the cantilever by counteracting additional vibrations.

25 Claims, 7 Drawing Sheets

U.S. PATENT DOCUMENTS

2007/0104079 A1* 5/2007 Shigeno et al. ............. 369/126
2008/0023626 A1* 1/2008 Watanabe ................... 250/234
2008/0054928 A1* 3/2008 Shigeno et al. ............. 324/762
2008/0083270 A1* 4/2008 Mancevski ................... 73/105
2008/0110248 A1* 5/2008 Ito et al. ....................... 73/105

* cited by examiner

VIBRATION-TYPE CANTILEVER HOLDER AND SCANNING PROBE MICROSCOPE

BACKGROUND OF THE INVENTION

1. Field of the Invention

The present invention relates to a vibration-type cantilever holder to fasten a cantilever having a probe in its leading end vibratably with a predetermined frequency and amplitude, and a scanning probe microscope having the vibration-type cantilever.

2. Description of the Related Art

As is generally known, an SPM (Scanning Probe Microscope) has been known as a device to measure a sample of a metal, semiconductor, ceramic, resin, macromolecule, biomaterial, insulator, etc. within a micro-scale area, and perform observation, etc. concerning physical property information including the viscoelasticity of a sample and the surface profile of a sample. As for such SPM, there are various measuring modes depending on targets for measurement. As one of them has been known a vibration mode SPM, by which measurement is performed by vibrating a cantilever set on a cantilever holder (see e.g. JP-A-2003-42931).

Such vibration mode SPMs include, for example: DFM (Dynamic Force Mode Microscope), by which scan is performed while the distance between a probe and a sample is controlled so that vibration amplitudes of the cantilever vibrated sympathetically are stable; VE-AFM (Viscoelastic AFM), by which the distribution of viscoelasticity is measured by detecting the amplitude, sine component and cosine component of bending of the cantilever when a sample is driven into small vibration in Z direction perpendicular to a sample surface or the cantilever is driven into small vibration in Z direction perpendicular to the sample surface thereby to apply a periodic force to the cantilever during the time of operation of AFM; and LM-FFM (Lateral Force Modulation Friction Force Microscope), by which the distribution of friction force is measured by detecting the amplitude of torsional vibration of the cantilever when a sample or the cantilever is driven into lateral vibration in a horizontal direction in parallel to a sample surface during the time of operation of AFM.

However, measurements by the above-described conventional vibration mode SPMs have problems as described below.

Usually in vibrating a cantilever, a predetermined voltage is applied to a vibration source mounted to a cantilever holder to vibrate the source, and then the vibration is transmitted to the cantilever, whereby the cantilever is made to vibrate with a predetermined vibration frequency and amplitude. However, the vibration of the vibration source also travels to surrounding structures other than the cantilever to vibrate the surrounding structures. These vibrations affect vibrational characteristics of the cantilever, and thus the vibrational characteristics are other than those of ideal vibrating state.

As a result, when measurement of Q curve (a curve showing sympathetic vibrational characteristics of a cantilever) is performed, other collateral sympathetic vibrations B, which are additional sympathetic vibrations, in addition to the sympathetic vibration A of the cantilever arise as shown in FIG. 7. As a consequence, the resultant characteristics includes vibrational characteristics coming from surrounding structures other than the cantilever, which makes it difficult to correctly discriminate the sympathetic vibrational characteristics of the cantilever. Therefore, in some instances it is difficult to make precise settings for vibrational characteristics of the vibration frequency, amplitude, and phase.

Further, in some instances, sympathetic vibrational characteristics of the cantilever are influenced when a probe is made to approach a sample, and thus the probe cannot be brought close to a measurement area, or the probe is brought excessively close to the measurement area, resulting in the collision with the sample because of the change in optimum measurement condition.

Still further, in some instances, sympathetic vibrational characteristics of the cantilever are influenced during the time of scan, and thus it becomes difficult to continue a stable and precise measurement because of the change in optimum measurement condition.

SUMMARY OF THE INVENTION

The invention was made in consideration of those circumstances. It is an object of the invention to provide a vibration-type cantilever holder, which cuts off (or balance out) an additional vibration and vibrates a cantilever so that vibrational characteristics of only the cantilever are demonstrated, and a scanning probe microscope having the vibration-type cantilever holder.

To achieve the object, the invention provides a means as follows.

A vibration-type cantilever holder according to the invention may be a vibration-type cantilever holder for fastening a cantilever which is opposed to a sample, has a probe on its leading end, and is supported on a main body part at only a base end thereof, characterized by including: a cantilever-attaching stand on which the main body part is placed and fastened with the cantilever tilted at a predetermined angle with respect to the sample; a first vibration source fastened to the cantilever-attaching stand and vibrating with a phase and an amplitude depending on a predetermined waveform signal; a holder main body to which the first vibration source is fastened; and a second vibration source fastened to at least one location on the holder main body, and generating vibrations to balance out vibrations traveling from the first vibration source to the cantilever-attaching stand and holder main body.

With the vibration-type cantilever holder in connection with the invention, the cantilever can be fastened so as to be opposite to a sample by placing and fastening a cantilever main body part on a cantilever-attaching stand fastened to the holder main body with the first vibration source interposed therebetween. At this point, the cantilever-attaching stand tilts the cantilever by a predetermined angle with respect to the sample, and in this condition the cantilevered is fastened. After the cantilever is fastened, the first vibration source is made to vibrate according to a predetermined waveform signal. This vibration is transmitted to the cantilever through the cantilever-attaching stand. Thus, the cantilever vibrates with an amplitude and delay of phase depending on a waveform signal input to the first vibration source.

On the other hand, the vibration generated by the first vibration source not only vibrates the cantilever, but also travels to the cantilever-attaching stand and holder main body and thus vibrates the cantilever-attaching stand and holder main body at the same time. However, as the second vibration source is fastened in at least one place on the holder main body, unwanted vibration traveling from the first vibration source can be balanced out by operating the second vibration source concurrently with the first vibration source, and therefore the holder main body and cantilever-attaching stand can be prevented from vibrating as far as possible. That is, operating the first and second vibration sources in parallel allows vibrations generated by first and second vibration sources to counteract each other, and thus unwanted vibrations traveling to surrounding structures other than the cantilever can be cut off. Therefore, unlike a conventional cantilever holder, only the cantilever can be vibrated, whereby vibrational characteristics of only the cantilever can be obtained.

Hence, in measuring a Q curve, sympathetic vibrational characteristics of the cantilever can be discriminated correctly, and therefore precise settings can be made for vibrational characteristics of the vibration frequency, amplitude, phase, etc. of the cantilever. Thus, measurements by vibration mode SPM can be performed precisely at all times. This enables improvement of the accuracy of measurement, and makes the measurement by vibration mode SPM easier to use, which leads to enhancement of its convenience.

In addition, as vibrational characteristics of only the cantilever can be obtained reliably, unlike a conventional SPM, the probe can be brought close to a desired measurement area precisely when the probe is brought close to a sample. Also, from this point of view, the accuracy of measurement can be increased. In addition, since sympathetic vibrational characteristics of the cantilever are unchanged during the time of scan, stable measurements can be performed continuously.

Incidentally, more than one second vibration source may be fastened to the holder main body.

A vibration-type cantilever holder according to the invention may be the above-described vibration-type cantilever holder characterized in the second vibration source vibrates on receipt of a waveform signal adjusted at least in its phase based on a relative positional relation with the first vibration source and the predetermined waveform signal input to the first vibration source.

In the vibration-type cantilever holder in connection with the invention, t-h-e second vibration source vibrates on receipt of a waveform signal adjusted at least in phase (e.g. a signal inverted in phase) based on the relative positional relation with the first vibration source and the waveform signal input to the first vibration source. Accordingly, regardless of the place on the holder main body where the second vibration source is fastened, unwanted vibrations traveling to surrounding structures other than the cantilever from the first vibration source can be counteracted, and therefore vibrations other than the sympathetic vibration of the cantilever can be made minimum.

The second vibration source may be vibrated by timely adjusting the amplitude together with the phase. As a result of the adjustment, it is possible that the second vibration source accepts the same signal as that input to the first vibration source.

Since the place where the second vibration source is fastened can be selected freely as described above, the design flexibility can be enhanced.

A vibration-type cantilever holder according to the invention may be the above-described vibration-type cantilever holder characterized by further including a weight part for urging the second vibration source toward the holder main body.

With the vibration-type cantilever holder in connection with the invention, since the weight part urges the second vibration source toward the holder main body utilizing gravity, the force is easy to transmit. Thus, the vibration generated by the second vibration source can be transmitted to the holder main body efficiently. In other words, as transmission of vibration is furthered, unwanted vibrations traveling to surrounding structures other than the cantilever can be balanced out more reliably. Hence, it is possible to obtain vibrational characteristics of the cantilever more correctly.

A vibration-type cantilever holder according to the invention may be the above-described vibration-type cantilever holder characterized in the following three matters. The first is that the holder main body is formed in a tabular shape having a first face and second face opposite to each other. The second is that the first and second vibration sources are fastened on the first and second faces respectively so as to be opposed to each other with the holder main body interposed therebetween. The third is that the second vibration source vibrates on receipt of a predetermined waveform signal, identical to the predetermined waveform signal input to the first vibration source.

With the vibration-type cantilever holder in connection with the invention, the first and second vibration sources are fastened on the first and second faces respectively and opposed to each other with the holder main body interposed therebetween. On receipt of the same waveform signal as that input to the first vibration source, the second vibration source vibrates with the same amplitude and phase as those for the first vibration source. Thus, signals generated by both the vibration sources counteract each other, and unwanted vibrations traveling from the first vibration source to surrounding structures other than the cantilever can be balanced out more reliably.

Particularly, since the waveform signal input to the second vibration source is not a specially adjusted signal, but the same signal as that input to the first vibration source, complicated operation control is not required and the configuration thereof can be simplified.

A vibration-type cantilever holder according to the invention may be the above-described vibration-type cantilever holder characterized by further including a weight part for urging the second vibration source toward the holder main body.

With the vibration-type cantilever holder in connection with the invention, since the weight part urges the second vibration source toward the holder main body utilizing gravity, the force is easy to transmit. Thus, the vibration generated by the second vibration source can be transmitted to the holder main body efficiently. In other words, as transmission of vibration is furthered, unwanted vibrations traveling to surrounding structures other than the cantilever can be balanced out more reliably. Hence, it is possible to obtain vibrational characteristics of the cantilever more correctly.

A vibration-type cantilever holder according to the invention may be the above-described vibration-type cantilever holder characterized in the weight part is identical in shape and weight to the cantilever-attaching stand.

With the vibration-type cantilever holder in connection with the invention, since the weight part is identical with the cantilever-attaching stand in shape and weight, it can be considered that an arrangement such that two identical cantilever-attaching stands are provided on both opposing sides of the holder main body is adopted. Therefore, unwanted vibrations traveling to surrounding structures other than the cantilever can be counteracted more reliably. Hence, vibrational characteristics of the cantilever can be obtained more reliably.

A scanning probe microscope according to the invention is characterized by including: one of the above-described vibration-type cantilever holders; a cantilever having a probe on its leading end and supported on a main body part at only a base end thereof, the main body part fastened to the vibration-type cantilever holder; a stage on which a sample opposed to the probe is placed; a driving unit for relatively moving the probe and sample along a direction in parallel to a sample surface for scan and relatively moving the probe and sample along a direction perpendicular to the sample surface; a measurement unit for measuring displacement of a vibrating state of the cantilever; and a control unit for controlling the driving unit based on a result of the measurement by the measurement unit thereby to control a distance between the probe and sample surface so that the vibrating state of the cantilever is made stable during the scan, and for collecting observational data.

With the scanning probe microscope in connection with the invention, the cantilever depending on a sample is selected first, and its main body part is put on and fastened to the cantilever-attaching part. Thus, the cantilever is fastened to the vibration-type cantilever holder in the condition where it is tilted at a predetermined angle with respect to the sample. Subsequently, the first and second vibration sources are activated at the same time, thereby to vibrate the cantilever. Then, the probe is brought into contact with or close to a sample surface. In this condition, the probe and sample are relatively moved by the driving unit to execute scan. In this step, the control unit makes the driving unit adjust the distance between the cantilever and sample (or the height of the cantilever with respect to the sample) based on the result of measurements by the measurement unit so that vibration motion of the cantilever, e.g. the vibration amplitude (or frequency at the time of self-excited vibration), is made constant. Thus, it becomes possible to detect observational data, e.g. data concerning the height, and a change in phase thereby to perform the measurement of data about various kinds of physical properties (magnetic force, electric potential, etc.) and the like.

Particularly, since the scanning probe microscope includes a vibration-type cantilever holder which can correctly discriminate sympathetic vibrational characteristics of the cantilever by vibrating only the cantilever separately, measurement by the vibration mode SPM can be performed precisely and the reliability of the result of measurement can be increased.

In the case of using a technique such that a Q value is increased by controlling the Q value of the cantilever thereby to increase the sensitivity, the sensitivity can be improved more than usually expected because vibrations other than the vibration of the cantilever make factors to increase the measurement error.

A scanning probe microscope according to the invention may be the above-described scanning probe microscope characterized by further including: a detection part for detecting an additional waveform signal vibrating with an amplitude and a phase other than an amplitude and a phase coming from vibration of the cantilever, from the result of the measurement by the measurement unit; and a vibration source-dedicated power supply for inputting an adjustment signal adjusted at least in amplitude and phase to the second vibration source so as to balance out the additional waveform signal detected by the detection part.

With the scanning probe microscope in connection with the invention, the detection part detects an additional waveform vibrating with an amplitude and a phase other than those coming from vibration of the cantilever, from the result of measurement by the measurement unit. That is, the detection part detects a waveform of unwanted vibration which has traveled from the first vibration source to the surrounding structures such as the holder main body. Then, the vibration source-dedicated power supply feeds back and inputs an adjustment signal adjusted at least in amplitude and phase to the second vibration source so as to balance out and eliminate the waveform of unwanted vibration. Now, it is noted that a waveform synthesized by a combination of other different frequencies may be used as the adjustment signal.

This makes it possible to counteract unwanted vibration traveling from the first vibration source to surrounding structures other than the cantilever more reliably. Therefore, sympathetic vibrational characteristics of the cantilever can be discriminated more correctly and the accuracy of measurement can be improved further.

With the vibration-type cantilever holder in connection with the invention, parallel operations of the first and second vibration sources allow the vibrations generated by the sources to be counteracted mutually, and thus vibrations traveling to surrounding structures other than the cantilever, can be cut off. Hence, sympathetic vibrational characteristics of the cantilever can be discriminated correctly, and precise measurements by a vibration mode SPM can be performed at all times thereby to improve the accuracy of measurement. In addition, the measurement by a vibration mode SPM becomes easier to use, which leads to enhancement of its convenience.

With the scanning probe microscope in connection with the invention, since it includes a vibration-type cantilever holder which can correctly discriminate sympathetic vibrational characteristics of the cantilever, measurement by the vibration mode SPM can be performed precisely and the reliability of the result of measurement can be increased.

EMBODIMENTS

A vibration-type cantilever holder according to the first embodiment of the invention and a scanning probe microscope with the cantilever holder will be described with reference to FIGS. 1 to 3. It is noted here that as for this embodiment, a sample-scan method such that a sample is moved along a direction in three dimensions will be described as an example.

Figure 1:
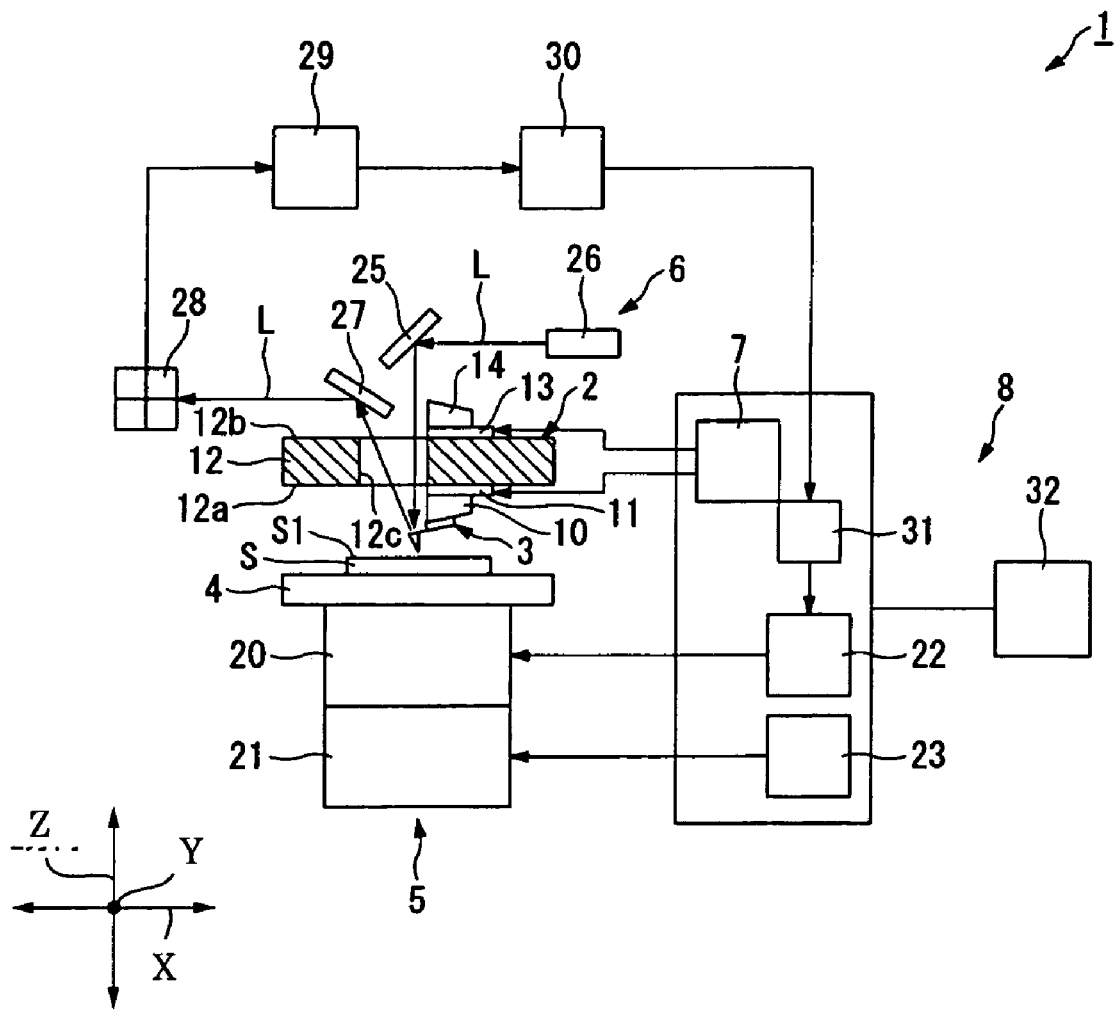
FIG. 1 is a block diagram of a scanning probe microscope in association with a first embodiment of the invention.

As shown in FIG. 1, the scanning probe microscope 1 according to the embodiment includes: a vibration-type cantilever holder 2; a cantilever 3 having a probe 3a on its leading or free end and supported on a main body part 3b at only a base end thereof, and fastened to the vibration-type cantilever holder 2 by the main body part 3b; a stage 4 to place a sample S on so that the sample is opposed to the probe 3a; a driving unit 5 for relatively moving the probe 3a and the sample S in X and Y directions in parallel with a sample surface S1 to scan the sample surface, and relatively moving the probe 3a and the sample S in the Z direction perpendicular to the sample surface S1; a measurement unit 6 for measuring displacement of the vibrating state of the cantilever 3; and a control unit 8 for controlling the driving unit 5 based on the result of the measurement by the measurement unit 6 so that the vibrating condition of the probe 3a of the cantilever 3 is made constant with respect to the sample surface S1 during the time of scan and for collecting observational data. Here, it is noted that in this embodiment, the case where the control unit 8 controls the driving unit 5 so that the amplitude of vibration of the cantilever 3 is made constant will be described as an example.

Figure 2:
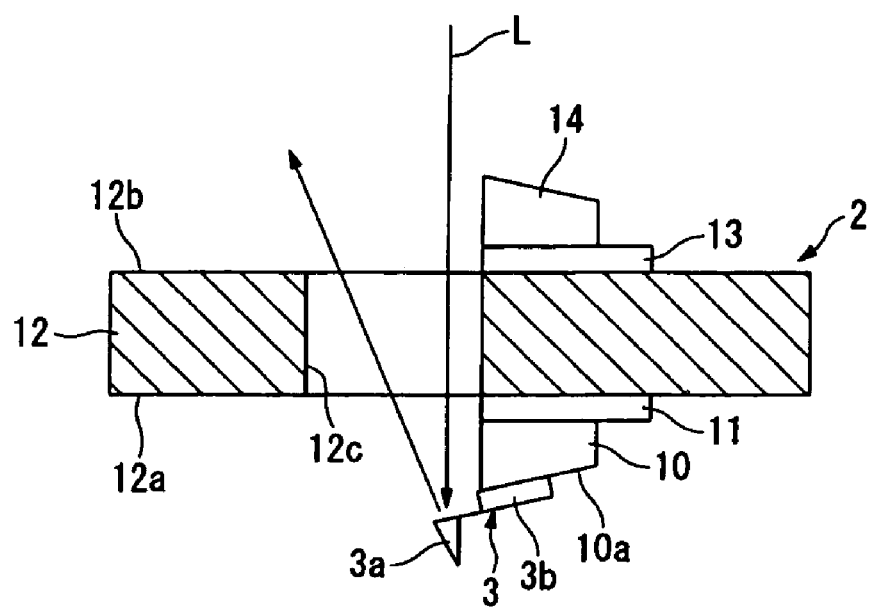
FIG. 2 is a side view of a vibration-type cantilever holder in association with the invention, which is a constituent part of the scanning probe microscope shown in FIG. 1.
Figure 3:
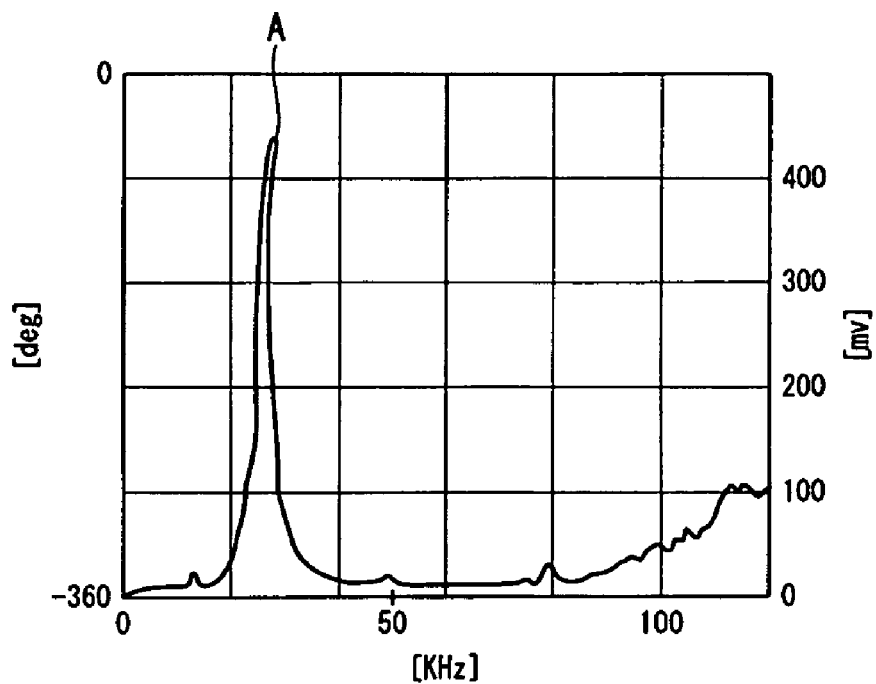
FIG. 3 is a view showing sympathetic vibrational characteristics of the cantilever fastened by the vibration-type cantilever holder shown in FIG. 2.

As shown in FIG. 2, the vibration-type cantilever holder 2 includes an attachment member in the form of a sloped block (cantilever-attaching stand) 10 having a cantilever-attaching face 10a on which the main body part 3b is placed and fastened with the cantilever 3 tilted at a predetermined angle with respect to the sample S; a vibration source (first vibration source) 11 fastened to the sloped block 10 and vibrating with a phase and an amplitude depending on a predetermined waveform signal; a holder main body 12 to which the vibration source 11 is fastened; and an opposing vibration source (second vibration source) 13 fastened to at least one location on the holder main body 12 and balancing out the vibrations transmitted from the vibration source 11 to the sloped block 10 and the holder main body 12.

The holder main body 12 is formed in a tabular shape, having a first face 12a and a second face 12b opposite to each other, and the first face 12a is arranged so as to face toward the sample S. Also, the holder main body 12 has an opening 12c formed therein, through which a laser light L to be described later reaches a reflecting face (not shown) of the fastened cantilever 3 and the laser light L reflected off the reflecting face is allowed to go out.

The vibration source 11 is fastened on the first face 12a, and is arranged so as to vibrate with a predetermined phase and amplitude according to a waveform signal input from a vibration source-dedicated power supply 7 shown in FIG. 1.

The sloped block 10 is fastened to a lower face of the vibration source 11 so that the cantilever-attaching face 10a is made to face the sample S. The main body part 3b of the cantilever 3 is placed on the cantilever-attaching face 10a, and fastened to the sloped block by use of e.g. a wire (not shown).

The opposing vibration source 13 is fastened in a position opposite (facing) to the vibration source 11 with the holder main body 12 interposed therebetween. The opposing vibration source 13 is arranged so that it receives a waveform signal from the vibration source-dedicated power supply 7, which is the same as that applied to the vibration source 11, and vibrates in the same phase and amplitude as the vibration source 11.

Further, the vibration-type cantilever holder 2 according to the embodiment includes a weight part 14 to urge the opposing vibration source 13 toward the holder main body 12. The weight part 14 is formed so as to have the same form and weight as those of the sloped block 10, and mounted on the opposing vibration source 13.

The vibration-type cantilever holder 2 thus configured is fastened by a pedestal (not shown) above the sample S, as shown in FIG. 1. The stage 4 is placed on an XY scanner 20. The XY scanner 20 is placed on a Z scanner 21. Further, the Z scanner 21 is placed on a vibration-proof table (not shown).

The XY scanner 20 and Z scanner 21 are e.g. piezo-devices, and arranged so that they are moved by a small distance in an appropriate direction when an XY driving part 22 and a Z driving part 23 apply a voltage to them respectively. In other words, the XY scanner 20 and Z scanner 21, XY driving part 22 and Z driving part 23 constitute the driving unit 5.

Also, above the vibration-type cantilever holder 2 are provided a light-illumination part 26 and a light-detection part 28. The light-illumination part 26 utilizes a mirror 25 to irradiate the reflecting face (not shown) formed in a rear face of the cantilever 3 with a laser light L. The light-detection part 28 utilizes a mirror 27 to receive the laser light L reflected off the reflecting face. The laser light L emitted by the light-illumination part 26 goes through the opening 12c of the holder main body 12 to reach the reflecting face, and is reflected by the reflecting face. After that, the laser light L goes through the opening 12c again, and then enters the light-detection part 28.

The light-detection part 28 may be e.g. a photodetector, which detects vibrating state (i.e. an amplitude) of the cantilever 3 relative to an incident position of the laser light L. Then, the light-detection part 28 outputs the displacement of the detected vibrating state of the cantilever 3, to a preamplifier 29 as a DIF signal. In other words, the light-illumination part 26, mirrors 25 and 27, and light-detection part 28 constitute the measurement unit 6.

The DIF signal output from the light-detection part 28 is amplified by the preamplifier 29, sent to an AC-DC conversion circuit 30, converted into a DC signal there, and then sent to a Z voltage feedback circuit 31. The Z voltage feedback circuit 31 controls the feedback of the Z driving part 23 so that the DIF signal after the DC conversion is made constant at all times. Thus, the distance between the probe 3a and sample surface S1 can be controlled so that the vibrating state of the cantilever 3 becomes stable, i.e. the amplitude thereof is made constant when the scan is performed by the driving unit 5.

Also, the Z voltage feedback circuit 31 is connected with the control part 32. Therefore, the control part 32 can measure a surface profile of the sample S based on the DIF signal after the DC conversion, and detect the change in phase thereby to measure various kinds of information about physical properties (e.g. a magnetic force, an electric potential, etc.).

In other words, the Z voltage feedback circuit 31 and the control part 32 constitute the control unit 8. Incidentally, the control unit 8 has the function of comprehensively controlling the above constituent parts.

Now, the case where a sample S is measured in a DFM, which is one of vibration mode SPMs, by use of a vibration type cantilever holder 2 and a scanning probe microscope 1 arranged like this will be described below.

First, initial settings for measurement are to be made. Specifically, an optimum cantilever 3 is selected depending on a sample targeted for the measurement. The cantilever 3 is fastened to the vibration-type cantilever holder 2. Subsequently, the sample S is placed on the stage 4, and then the positions of the light-illumination part 26 and light-detection part 28, the mounting condition of the cantilever 3, etc. are adjusted so that a laser light L impinges on the reflecting face of the cantilever 3 reliably and the laser light L after the reflection surely enters the light-detection part 28.

After that, the vibration source-dedicated power supply 7 outputs identical waveform signals to the vibration source 11 and the opposing vibration source 13 concurrently, whereby the vibration source 11 and the opposing vibration source 13 are made to vibrate with the same amplitude and phase. The vibration generated by the vibration source 11 is transmitted to the cantilever 3 through the sloped block 10, and therefore the cantilever 3 can be vibrated with the amplitude and the delay of phase depending on the waveform signal. Further, the vibration not only forces the cantilever 3 to vibrate, but also travels to the sloped block 10 and holder main body 12, and therefore it causes these surrounding structures to vibrate simultaneously.

However, as the vibration coming from the opposing vibration source 13 opposed to the vibration source 11 with the holder main body 12 interposed between them is transmitted to the holder main body 12 and sloped block 10, the vibration transmitted from the vibration source 11 is counteracted. As a result, unwanted vibrations coming from the vibration source 11 can be balanced out to prevent the holder main body 12 and sloped block 10 from vibrating. That is, parallel operations of the vibration source 11 and opposing vibration source 13 allow the vibrations generated by the sources to be counteracted mutually, and thus unwanted vibrations traveling to surrounding structures other than the cantilever 3, can be cut off. Therefore, unlike a conventional cantilever holder, as only the cantilever 3 can be made to vibrate, vibrational characteristics of the cantilever 3 can be gained separately.

Figure 7:
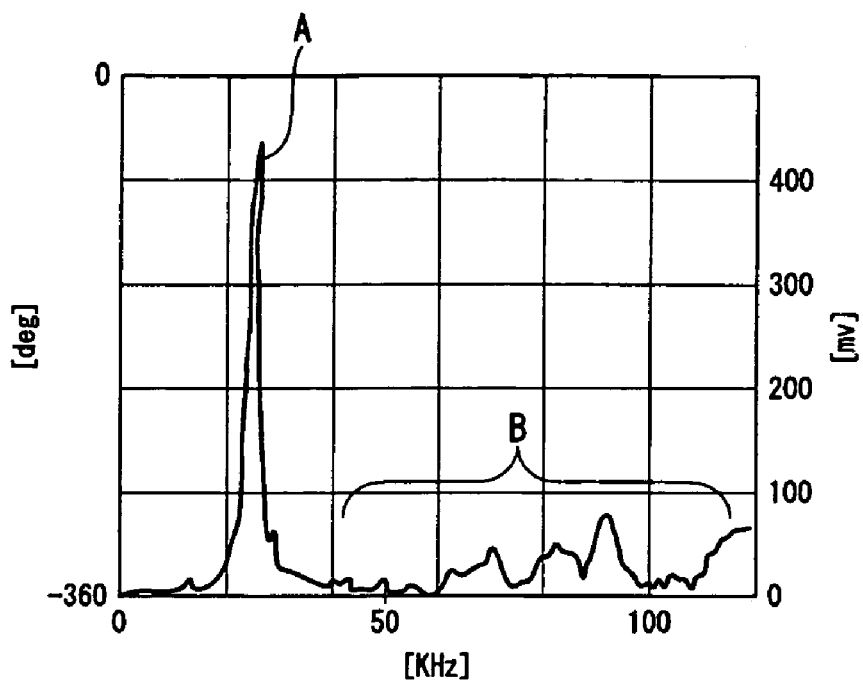
FIG. 7 is a view showing sympathetic vibrational characteristics of a cantilever fastened by a conventional vibration-type cantilever holder.

Subsequently, the cantilever 3 is made to vibrate, followed by making Q-curve measurement and setting of an operation point, which is an optimum value of frequency of applied vibrations. In this step, because the opposing vibration source 13 prevents from causing the constituent parts (i.e. surrounding structures) other than the cantilever 3 to vibrate as described above, it is hard to create collateral sympathetic vibrations other than the sympathetic vibration A of the cantilever 3 as shown in FIG. 3. (It is clear that the generated collateral sympathetic vibrations B are less than that in FIG. 7.) Thus, characteristics of the sympathetic vibration of the cantilever 3 can be discriminated correctly, and therefore it becomes possible to make correct settings with respect to vibrational characteristics of the vibration frequency, amplitude, phase, etc. of the cantilever 3.

After the above initial settings have been made, measurement of a sample S is performed.

Specifically, the distance between the probe 3a and a surface of the sample S targeted for measurement is controlled so that the amplitude is made constant. In this condition, the XY scanner 20 is moved by the XY driving part 22 and then scan of the sample S is performed. During the time of scan, the amplitude of the cantilever 3 tends to widen and narrow according to the asperity of the sample surface S1, and thus the amplitude of a laser light L entering the light-detection part 28 (i.e. laser light reflected off the reflecting face) varies. The light-detection part 28 outputs a DIF signal depending on the amplitude to the preamplifier 29. The output DIF signal is amplified by the preamplifier 29 and converted into a DC signal by the AC-DC conversion circuit 30, and then sent to the Z voltage feedback circuit 31.

The Z voltage feedback circuit 31 performs the feedback control while making the Z driving part 23 move the Z scanner 21 in Z direction by a small distance so that the DIF signal after DC conversion is made constant at all times, i.e. the amplitude of the cantilever is made stable. This enables the scan to be performed under the condition where the distance between the probe 3a and a surface of the sample S targeted for measurement is controlled so as to be constant. Also, the control part 32 measures the surface profile of the sample S based on the signal which is made to rise and fall by the Z voltage feedback circuit 31.

Particularly, as correct settings with respect to the vibrational characteristics of the cantilever 3 have been made by the vibration-type cantilever holder 2, measurement by DFM can be made correctly at all times in measurement of a Q curve, and therefore the accuracy of measurement can be improved. In addition, the measurement by DFM becomes easier to use, which leads to enhancement of its convenience.

Further, as vibrational characteristics of the cantilever 3 alone can be obtained reliably, the probe 3a can be made to come close to a desired measurement area reliably when the probe 3a is brought near to the sample S. Also, on this account, the accuracy of measurement can be improved. In addition, as sympathetic vibrational characteristics of the cantilever 3 are unchanged during the time of scan, stable measurements can be performed continuously.

As described above, the scanning probe microscope 1 according to the embodiment includes a vibration-type cantilever holder 2 which allows the cantilever 3 to be vibrated separately, thereby making possible to correctly discriminate sympathetic vibrational characteristics of the cantilever 3. Thus, the measurement by DFM can be performed correctly, and therefore the reliability of the result of the measurement can be increased.

Also, since the waveform signal input to the opposing vibration source 13 is not a particularly adjusted signal, but the same signal as that input to the vibration source 11, the vibration source-dedicated power supply 7 does not have to output different waveform signals. Therefore, complicated control is not required, and the configuration thereof can be simplified.

Further, as the weight part 14 urges the opposing vibration source 13 toward the holder main body 12 utilizing gravity, the force is easy to transmit. Thus, the vibration generated by the opposing vibration source 13 can be transmitted to the holder main body 12 efficiently. In other words, as transmission of vibration is furthered, unwanted vibrations traveling from the vibration source 11 to constituent parts other than the cantilever 3 can be balanced out more reliably. Hence, it is easier to obtain vibrational characteristics of the cantilever 3 correctly.

Moreover, in this embodiment, since the weight part 14 is identical with the sloped block 10 in shape and weight; it can be considered that an arrangement such that two identical sloped blocks 10 are provided on both opposing sides of the holder main body 12 is adopted. Therefore, unwanted vibrations traveling from the vibration source 11 to constituent parts other than the cantilever 3 can be counteracted more reliably, and vibrational characteristics of the cantilever 3 can be obtained with higher accuracy.

Figure 4:
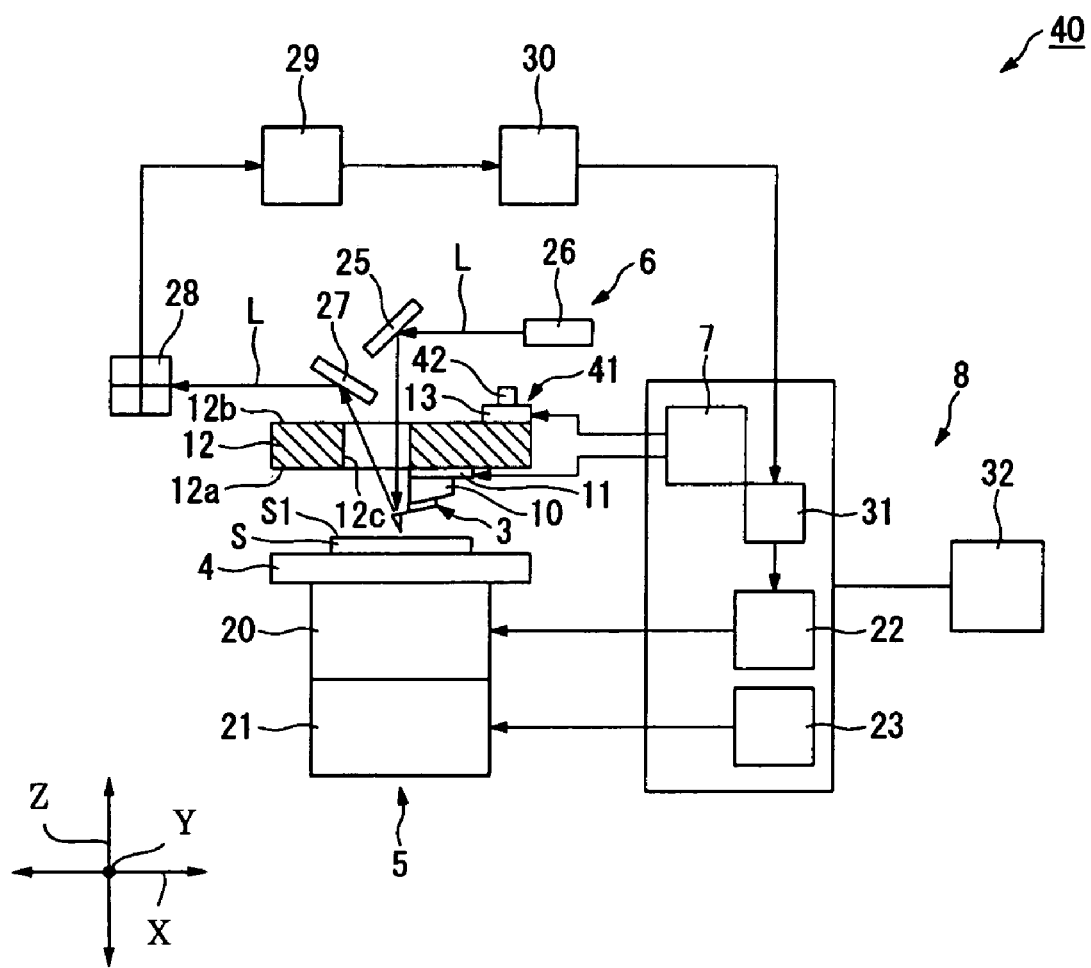
FIG. 4 is a block diagram of a scanning probe microscope in association with a second embodiment of the invention.

Now, a vibration-type cantilever holder according to the second embodiment of the invention and a scanning probe microscope with the cantilever holder will be described with reference to FIGS. 4 and 5. Here, like parts in the second embodiment are discriminated by the same reference numerals as those in the first embodiment, and the descriptions are omitted.

The second embodiment is different from the first embodiment as follows. That is, while in the first embodiment the opposing vibration source 13 is fastened on the second face 12b of the holder main body 12 so as to be opposed to the vibration source 11, the scanning probe microscope 40 according to the second embodiment includes a vibration-type cantilever holder 41, in which an opposing vibration source 13 is not opposed to the vibration source 11, as shown in FIG. 4.

Figure 5:
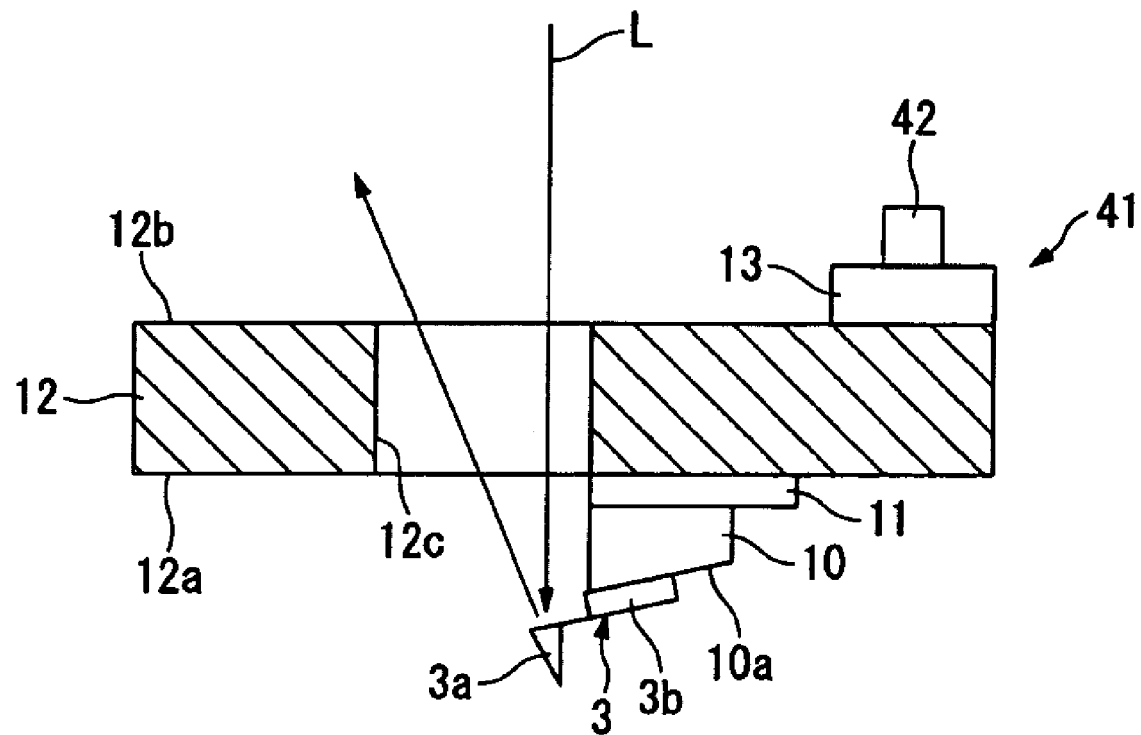
FIG. 5 is a side view of a vibration-type cantilever holder in association with the invention, which is a constituent part of the scanning probe microscope shown in FIG. 4.

Specifically, in this embodiment the vibration-type cantilever holder 41 is fastened on an end portion of a second face 12b as shown in FIG. 5. On the opposing vibration source 13 is mounted a weight part 42 for urging the opposing vibration source 13 toward the holder main body 12 as in the first embodiment. However, unlike the weight part 14 in the first embodiment, the weight part 42 is formed so as to have a different size and weight, which are different from those of the sloped block 10.

In this embodiment, the opposing vibration source 13 is arranged so as to vibrate on receipt of a waveform signal previously adjusted at least in its phase based on its relative positional relation with the vibration source 11 and a waveform signal input to the vibration source 11. Specifically, a signal having an inverted phase with respect to the phase of a waveform signal input to the vibration source 11 by the vibration source-dedicated power supply 7 is input to the opposing vibration source 13, thereby to vibrate the opposing vibration source 13. Thus, regardless of the place on the holder main body 12 where the opposing vibration source 13 is fastened, unwanted vibrations traveling to constituent parts other than the cantilever 3 from the vibration source 11 can be counteracted, and therefore vibrations other than the sympathetic vibration of the cantilever 3 can be reduced.

Further, since the vibration-type cantilever holder 41 includes a weight part 42 as in the first embodiment, vibrations caused by the opposing vibration source 13 can be transmitted to the holder main body 12 efficiently.

Incidentally, in this embodiment, the opposing vibration source 13 may be vibrated by timely adjusting the amplitude together with the phase (, or synthesizing another waveform resulting from a combination of different frequencies depending on the circumstances). Also, it is conceivable that the signal as that input to the vibration source 11 makes an optimum signal as a result of the adjustment.

Particularly, with the vibration-type cantilever holder 41 according to this embodiment, as the position where the opposing vibration source 13 is fastened can be selected freely, the design flexibility can be enhanced.

Figure 6:
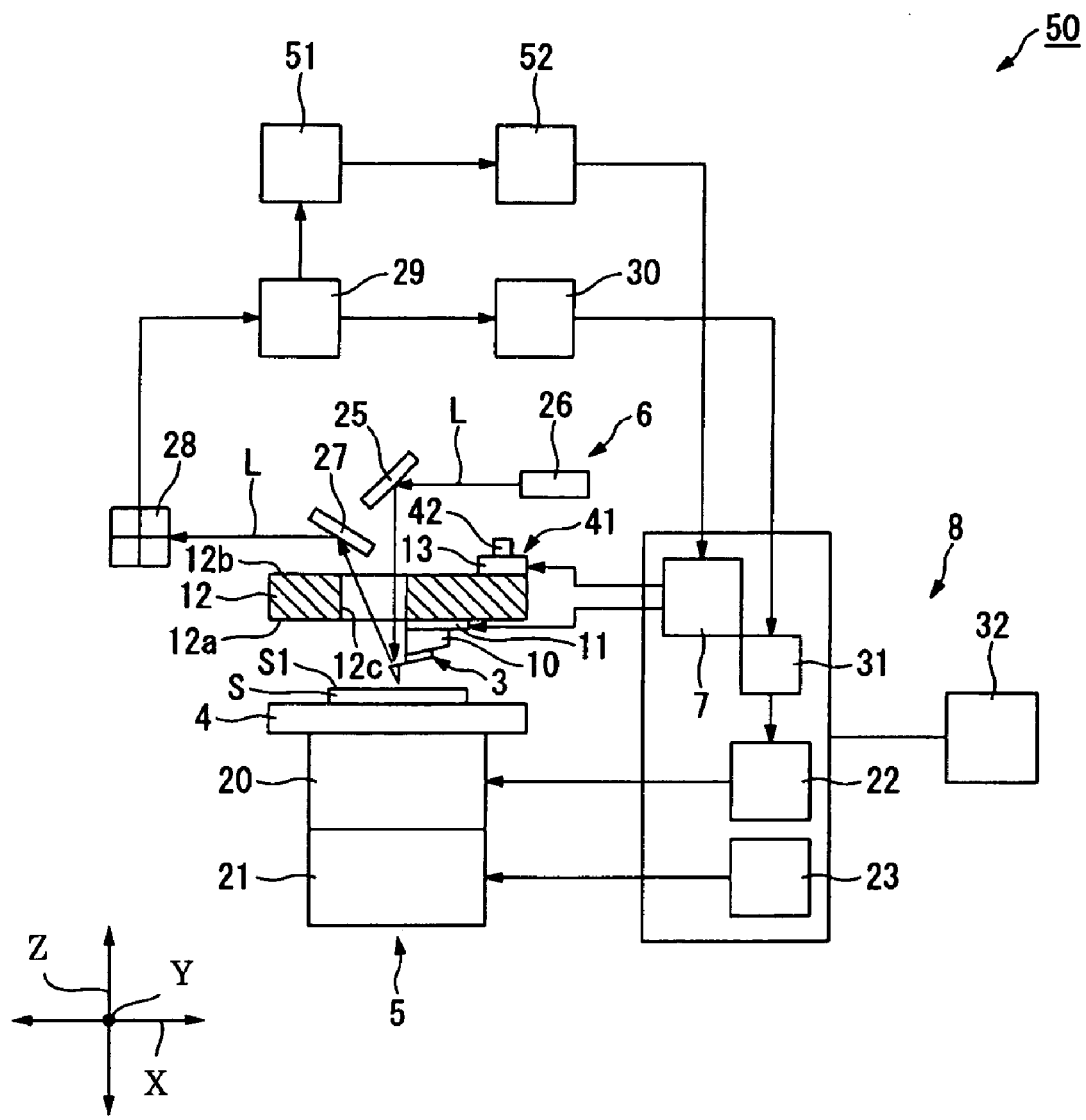
FIG. 6 is a block diagram of a scanning probe microscope in association with a third embodiment of the invention.

Next, a vibration-type cantilever holder according to the third embodiment of the invention and a scanning probe microscope with the cantilever holder will be described with reference to FIG. 6. Here, like parts in the third embodiment are discriminated by the same reference numerals as those in the second embodiment, and the descriptions are omitted.

The third embodiment is different from the second embodiment as follows. That is, while in the second embodiment a signal previously adjusted at least in its phase is input to the opposing vibration source 13, the scanning probe microscope 50 according to the third embodiment measures other vibrations except the vibration of the cantilever 3 and causes the opposing vibration source 13 to vibrate based on the result of the measurement.

Specifically, the scanning probe microscope 50 according to the third embodiment includes: a cut filter (detection part) 51 for detecting a waveform signal vibrating with an amplitude and a phase other than the vibration of the cantilever 3 from the result of the measurement by the measurement unit 6; and an adjustment circuit 52 for outputting an adjustment signal to the vibration source-dedicated power supply 7, which has been adjusted at least in its amplitude and phase (or which has a waveform synthesized by a combination of other different frequencies depending on the circumstances) so as to balance out the other waveform signals detected by the cut filter 51. Also, the vibration source-dedicated power supply 7 vibrates the opposing vibration source 13 based on the adjustment signal sent from the adjustment circuit 52.

Here, the cut filter 51 cuts off only the sympathetic vibration frequency of the cantilever 3 among DIF signals amplified by the preamplifier 29, and detects other signals other than that (other waveform signals). The adjustment circuit 52 inverts in phase an input signal and adjusts the signal in gain so that detected other waveform signals are made minimum, and then outputs a signal inverted in phase to the vibration source-dedicated power supply 7 as an adjustment signal subjected to amplitude adjustment.

Then, the vibration source-dedicated power supply 7 vibrates the opposing vibration source 13 with a phase and an amplitude depending on the adjustment signal. Thus, it becomes possible to counteract unwanted vibration traveling from the vibration source 11 to constituent parts other than the cantilever 3 with more reliability.

Therefore, sympathetic vibrational characteristics of the cantilever 3 can be discriminated more correctly, and thus the accuracy of measurement can be improved.

The technical scope of the invention is not limited to the above embodiment, and various changes and modifications may be made without departing from the subject matter of the invention.

While in the first embodiment, for example, the weight part has the same shape and weight as those of the sloped block, it is not so limited. The size and weight of the weight part may be set freely. Further, the weight part is not essential, and it does not have to be provided. However, it is preferable to provide such weight part because it allows the vibration of the opposing vibration source to be transmitted to the holder main body efficiently. Further, it is more preferable to provide a weight part having the same shape and weight as those of the sloped block as in the embodiment.

Further, while in the second and third embodiments the opposing vibration source is fastened on the second face of the holder main body, the position of the opposing vibration source is not limited to such position. The opposing vibration source may be fastened e.g. on the first face as in the case of the vibration source, or it may be fastened on a side face of the holder main body. In addition, more than one opposing vibration sources may be fastened, and the number of the opposing vibration sources is not limited to one.

Figure 8:
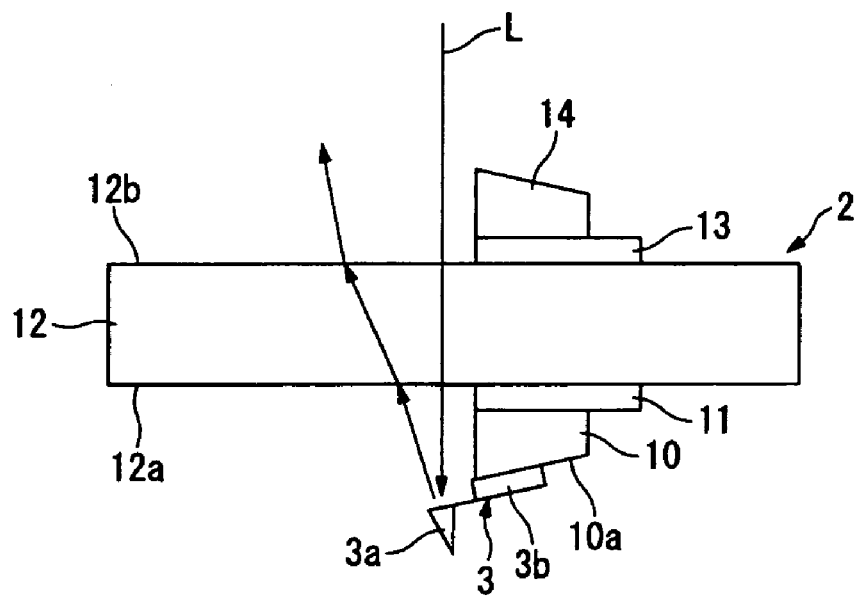
FIG. 8 is a view showing, as a modification of the vibration-type cantilever holder shown in FIG. 2, a vibration-type cantilever holder with no opening formed therein.

Further, the above embodiments are arranged so that a laser light goes through an opening formed in the holder main body and then impinges on the cantilever, and the reflected laser light goes out through the opening. However, the invention is not so limited. For example, the holder main body 12 may be formed from an optically transparent material (e.g. glass) to eliminate the opening 12c, as shown in FIG. 8.

In this case, a laser light L emitted by the light-illumination part 26 enters the holder main body 12 at right angles to the second face 12b of the holder main body and impinges on the reflecting face of the cantilever 3. Then, the laser light L reflected off the reflecting face is incident on the first face 12a of the holder main body 12 on the skew, repeats refractions, and then goes out toward the light-detection part 28. Thus, the opening 12c can be eliminated by forming the holder main body 12 from an optically transparent material, and therefore the time and labor to form the opening 12c can be saved.

Further, in the embodiments, the distance between the probe and a sample is controlled so that the vibration amplitude of the cantilever is made constant during the time of scan. However, this is not limited to the vibration amplitude, the distance between the probe and a sample may be controlled so that the vibrating state of the cantilever is made stable. For example, the distance may be controlled so that the frequency or angle of the cantilever is made constant.

Still further, while the embodiments have been described taking, as an example, a sample-scan method by which a sample is moved along a direction in three dimensions, the invention is not so limited. A cantilever-scan method by which the cantilever is moved along a direction in three dimensions may be adopted.

Figure 9:
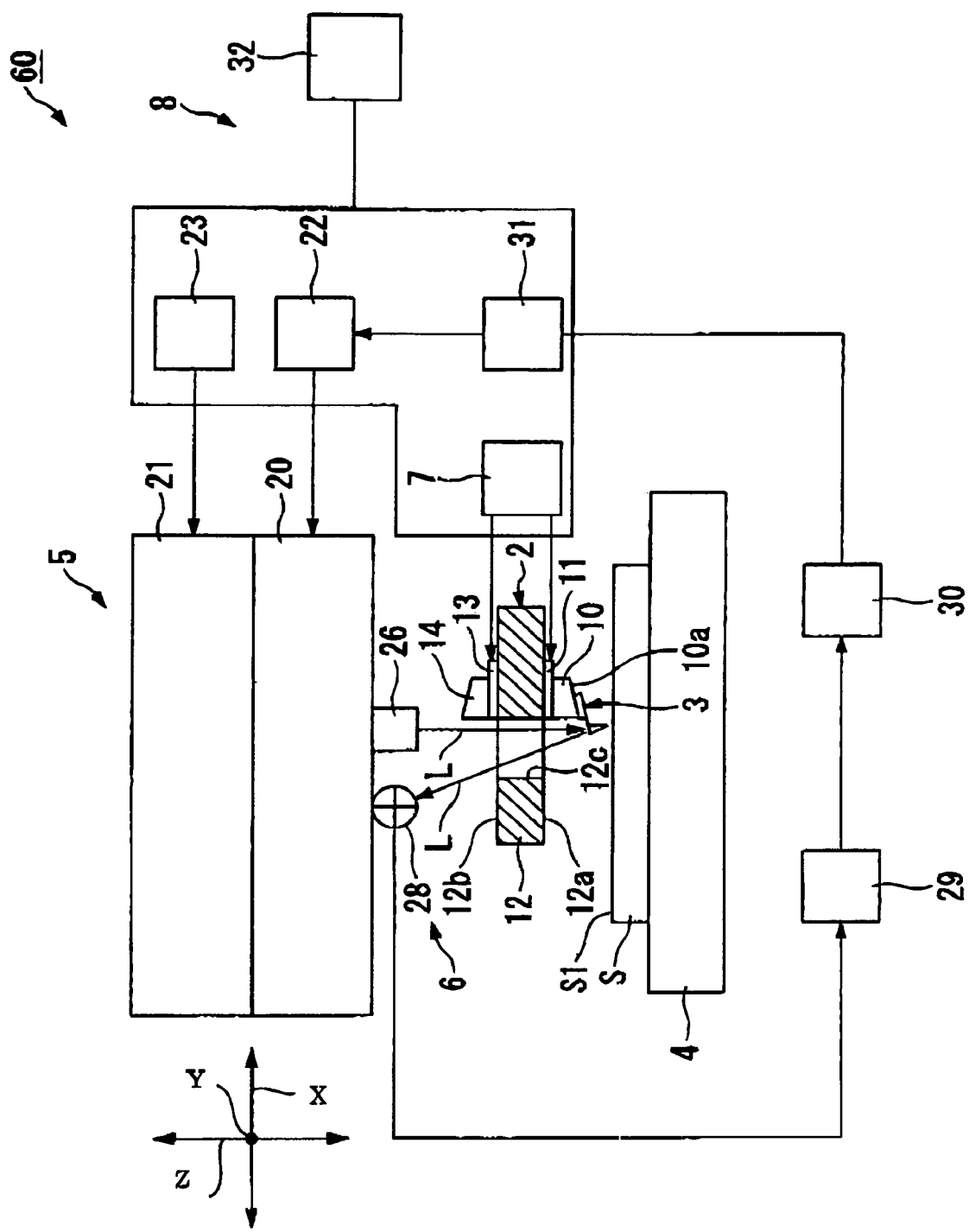
FIG. 9 a view showing, as a modification of the scanning probe microscope shown in FIG. 1, a cantilever-scan type scanning probe microscope, in which a cantilever is moved along a direction in three dimensions.

For example, as shown in FIG. 9, in a scanning probe microscope 60, the vibration-type cantilever holder 2 is fastened on the side of a rear face of the XY scanner 20 through a pedestal (not shown). The XY scanner 20 is fastened on a rear face of the Z scanner 21. The sample S is placed on a fixed stage 4. Thus, when the XY scanner 20 and Z scanner 21 are operated by the XY driving part 22 and Z driving part 23, the probe 3a and sample S can be relatively moved along a direction in three dimensions.

Furthermore, on the side of the rear face of the XY scanner 20, the light-illumination part 26 and light-detection part 28 are fastened together with the vibration-type cantilever holder 2. Thus, a laser light L can impinge on the reflecting face of the cantilever 3 at all times.

Also, the scanning probe microscope 60 configured like this can bring about the same effects and advantages as those achieved by the scanning probe microscope 1 according to the first embodiment. These microscopes are merely different in scanning method.

It is noted that an arrangement such that the sample S and cantilever 3 can be moved along a direction in three dimensions together may be adopted.

While in the embodiments the case where measurement by DFM is performed as an example of the vibration mode SPM has been taken, the invention is not so limited. For example, an MFM (Magnetic Force Microscope), by which measurements on a distribution of magnetism, a magnetic domain structure, etc. Of a magnetic material's sample are performed by vibrating a cantilever having a probe capable of sensing magnetism in the same way, and detecting the bending amplitude and phase of the cantilever during this time, also can bring about the same effects and advantages.

In addition, not only the MFM, but also other SPMs e.g. SMM (Scanning Maxwell-stress Microscope) and KFM (Kelvin Probe Force Microscope), by which measurements concerning e.g. a potential distribution on a surface of a sample, etc. are performed by sensing the bending amplitude of a conducting probe (cantilever), while an AC bias voltage is applied between the cantilever and sample to vibrate the cantilever by means of capacitive coupling of the probe and sample, can bring about the same effects and advantages.

Also, the following microscopes can bring about the same effects and advantages, for example: LM-FFM (Lateral Force Modulation Friction Force Microscope), by which the distribution of friction force is measured by detecting the amplitude of torsional vibration of a cantilever when a sample or the cantilever is driven into lateral vibration in a horizontal direction in parallel to a sample surface during the time of operation of AFM and; VE-AFM (Viscoelastic AFM), by which the distribution of viscoelasticity is measured by detecting the amplitude, sine component and cosine component of bending of a cantilever when a sample S is driven into small vibration in Z direction perpendicular to a sample surface S1 thereof or the cantilever is driven into small motion in Z direction perpendicular to the sample surface thereby to apply a periodic force to the cantilever during the time of operation of AFM.

Moreover, while in the above embodiments the displacement of the cantilever is detected by use of an optical lever technique as the measurement unit, the invention is not limited to the optical lever technique. For example, a self-sensing technique, by which the cantilever is provided with e.g. a piezoresistor element so that the cantilever itself has the function of detecting the displacement, may be adopted.

What is claimed is:

1. A vibration-type cantilever holder for fastening a cantilever opposed to a sample, the cantilever having a probe on its leading end and supported on a main body part at only a base end thereof, comprising:
    a cantilever-attaching stand on which the main body part of the cantilever is placed and fastened with the cantilever tilted at a predetermined angle with respect to the sample;
    a first vibration source fastened to the cantilever-attaching stand and that vibrates with a phase and an amplitude depending on a predetermined waveform signal;
    a holder main body to which the first vibration source is fastened; and
    a second vibration source fastened to the holder main body at at least one location which is spaced from the location at which the first vibration source is fastened to the holder main body, and that generates vibrations to balance out vibrations traveling from the first vibration source to the cantilever-attaching stand and the holder main body.

2. The vibration-type cantilever holder of claim 1; wherein the second vibration source vibrates on receipt of a waveform signal adjusted at least in its phase based on a relative positional relation with the first vibration source and the predetermined waveform signal input to the first vibration source.

3. The vibration-type cantilever holder of claim 1; further comprising a weight part for urging the second vibration source toward the holder main body.

4. The vibration-type cantilever holder of claim 1; wherein the holder main body is formed in a tabular shape having a first face and second face opposite to each other,
    the first and second vibration sources are fastened on the first and second faces respectively so as to be opposed to each other with the holder main body interposed therebetween, and
    the second vibration source vibrates on receipt of a predetermined waveform signal identical to the predetermined waveform signal input to the first vibration source.

5. The vibration-type cantilever holder of claim 4; further comprising a weight part for urging the second vibration source toward the holder main body.

6. The vibration-type cantilever holder of claim 5; wherein the weight part is identical in shape and weight to the cantilever-attaching stand.

7. A scanning probe microscope comprising:
    the vibration-type cantilever holder of claim 1;
    a cantilever having a probe on its leading end and supported on a main body part at only a base end thereof, the main body part being fastened to the vibration-type cantilever holder;
    a stage on which a sample opposed to the probe is placed;
    a driving unit for relatively moving the probe and sample along a direction in parallel to a sample surface for scanning and relatively moving the probe and sample along a direction perpendicular to the sample surface;
    a measurement unit for measuring displacement of a vibrating state of the cantilever; and
    a control unit for controlling the driving unit based on a result of the measurement by the measurement unit thereby to control a distance between the probe and sample surface so that the vibrating state of the cantilever is made stable during scanning, and for collecting observational data.

8. A scanning probe microscope comprising:
the vibration-type cantilever holder of claim 2;
a cantilever having a probe on its leading end and supported on a main body part at only a base end thereof, the main body part being fastened to the vibration-type cantilever holder;
a stage on which a sample opposed to the probe is placed;
a driving unit for relatively moving the probe and sample along a direction in parallel to a sample surface for scanning and relatively moving the probe and sample along a direction perpendicular to the sample surface;
a measurement unit for measuring displacement of a vibrating state of the cantilever; and
a control unit for controlling the driving unit based on a result of the measurement by the measurement unit thereby to control a distance between the probe and sample surface so that the vibrating state of the cantilever is made stable during scanning, and for collecting observational data.

9. A scanning probe microscope comprising:
the vibration-type cantilever holder of claim 3;
a cantilever having a probe on its leading end and supported on a main body part at only a base end thereof, the main body part being fastened to the vibration-type cantilever holder;
a stage on which a sample opposed to the probe is placed;
a driving unit for relatively moving the probe and sample along a direction in parallel to a sample surface for scanning and relatively moving the probe and sample along a direction perpendicular to the sample surface;
a measurement unit for measuring displacement of a vibrating state of the cantilever; and
a control unit for controlling the driving unit based on a result of the measurement by the measurement unit thereby to control a distance between the probe and sample surface so that the vibrating state of the cantilever is made stable during scanning, and for collecting observational data.

10. A scanning probe microscope comprising:
the vibration-type cantilever holder of claim 4;
a cantilever having a probe on its leading end and supported on a main body part at only a base end thereof, the main body part being fastened to the vibration-type cantilever holder;
a stage on which a sample opposed to the probe is placed;
a driving unit for relatively moving the probe and sample along a direction in parallel to a sample surface for scanning and relatively moving the probe and sample along a direction perpendicular to the sample surface;
a measurement unit for measuring displacement of a vibrating state of the cantilever; and
a control unit for controlling the driving unit based on a result of the measurement by the measurement unit thereby to control a distance between the probe and sample surface so that the vibrating state of the cantilever is made stable during scanning, and for collecting observational data.

11. A scanning probe microscope comprising:
the vibration-type cantilever holder of claim 5;
a cantilever having a probe on its leading end and supported on a main body part at only a base end thereof, the main body part being fastened to the vibration-type cantilever holder;
a stage on which a sample opposed to the probe is placed;
a driving unit for relatively moving the probe and sample along a direction in parallel to a sample surface for scanning and relatively moving the probe and sample along a direction perpendicular to the sample surface;
a measurement unit for measuring displacement of a vibrating state of the cantilever; and
a control unit for controlling the driving unit based on a result of the measurement by the measurement unit thereby to control a distance between the probe and sample surface so that the vibrating state of the cantilever is made stable during scanning, and for collecting observational data.

12. A scanning probe microscope comprising:
the vibration-type cantilever holder of claim 6;
a cantilever having a probe on its leading end and supported on a main body part at only a base end thereof, the main body part being fastened to the vibration-type cantilever holder;
a stage on which a sample opposed to the probe is placed;
a driving unit for relatively moving the probe and sample along a direction in parallel to a sample surface for scanning and relatively moving the probe and sample along a direction perpendicular to the sample surface;
a measurement unit for measuring displacement of a vibrating state of the cantilever; and
a control unit for controlling the driving unit based on a result of the measurement by the measurement unit thereby to control a distance between the probe and sample surface so that the vibrating state of the cantilever is made stable during scanning, and for collecting observational data.

13. The scanning probe microscope of claim 7, further comprising:
a detection part for detecting an additional waveform signal vibrating with an amplitude and a phase other than an amplitude and a phase coming from vibration of the cantilever, from the result of the measurement by the measurement unit; and
a vibration source-dedicated power supply for inputting an adjustment signal adjusted at least in amplitude and phase to the second vibration source so as to balance out the additional waveform signal detected by the detection part.

14. The scanning probe microscope of claim 8, further comprising:
a detection part for detecting an additional waveform signal vibrating with an amplitude and a phase other than an amplitude and a phase coming from vibration of the cantilever, from the result of the measurement by the measurement unit; and
a vibration source-dedicated power supply for inputting an adjustment signal adjusted at least in amplitude and phase to the second vibration source so as to balance out the additional waveform signal detected by the detection part.

15. The scanning probe microscope of claim 9, further comprising:
a detection part for detecting an additional waveform signal vibrating with an amplitude and a phase other than an amplitude and a phase coming from vibration of the cantilever, from the result of the measurement by the measurement unit; and
a vibration source-dedicated power supply for inputting an adjustment signal adjusted at least in amplitude and phase to the second vibration source so as to balance out the additional waveform signal detected by the detection part.

16. The scanning probe microscope of claim 10, further comprising:

a detection part for detecting an additional waveform signal vibrating with an amplitude and a phase other than an amplitude and a phase coming from vibration of the cantilever, from the result of the measurement by the measurement unit; and a vibration source-dedicated power supply for inputting an adjustment signal adjusted at least in amplitude and phase to the second vibration source so as to balance out the additional waveform signal detected by the detection part.

17. The scanning probe microscope of claim 11, further comprising:

a detection part for detecting an additional waveform signal vibrating with an amplitude and a phase other than an amplitude and a phase coming from vibration of the cantilever, from the result of the measurement by the measurement unit; and a vibration source-dedicated power supply for inputting an adjustment signal adjusted at least in amplitude and phase to the second vibration source so as to balance out the additional waveform signal detected by the detection part.

18. The scanning probe microscope of claim 12, further comprising:

a detection part for detecting an additional waveform signal vibrating with an amplitude and a phase other than an amplitude and a phase coming from vibration of the cantilever, from the result of the measurement by the measurement unit; and a vibration source-dedicated power supply for inputting an adjustment signal adjusted at least in amplitude and phase to the second vibration source so as to balance out the additional waveform signal detected by the detection part.

19. A holder for holding a base end of a cantilever that has a probe at a free end thereof, the holder comprising: a holder main body; an attachment member to which the base end of the cantilever is attached; a first vibration source interposed between and fastened to the holder main body and the attachment member, the first vibration source being positioned at a first location on the holder main body and generating vibrations in response to a waveform signal inputted thereto to vibrate the cantilever through the attachment member; and a second vibration source that is fastened to the holder main body at a second location spaced from the first location and that generates vibrations in response to a waveform signal inputted thereto to counteract vibrations transmitted to the holder main body and the attachment member by the first vibration source.

20. A holder according to claim 19; wherein the first and second vibration sources are positioned opposite one another on opposite faces of the holder main body.

21. A holder according to claim 20; wherein the waveform signals inputted to the first and second vibration sources have the same phase.

22. A holder according to claim 20; further including a weight provided on the second vibration source to urge the second vibration source toward the holder main body.

23. A holder according to claim 19; wherein the first and second vibration sources are positioned on opposite faces of the holder main body but not directly opposite one another.

24. A holder according to claim 23; wherein the waveform signals inputted to the first and second vibration sources are out of phase.

25. A holder according to claim 23; further including a weight provided on the second vibration source to urge the second vibration source toward the holder main body.

* * * * *